United States Patent
Kano

(10) Patent No.: US 10,782,535 B2
(45) Date of Patent: Sep. 22, 2020

(54) IMAGE FORMING OPTICAL SYSTEM AND IMAGE READING APPARATUS INCLUDING THE SAME

(71) Applicant: CANON KABUSHIKI KAISHA, Tokyo (JP)

(72) Inventor: Hiroto Kano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 15/764,281

(22) PCT Filed: Sep. 15, 2016

(86) PCT No.: PCT/JP2016/004209
§ 371 (c)(1),
(2) Date: Mar. 28, 2018

(87) PCT Pub. No.: WO2017/056435
PCT Pub. Date: Apr. 6, 2017

(65) Prior Publication Data
US 2018/0284462 A1    Oct. 4, 2018

(30) Foreign Application Priority Data

Sep. 30, 2015  (JP) .................................. 2015-194482

(51) Int. Cl.
| | |
|---|---|
| *G02B 27/14* | (2006.01) |
| *G02B 27/10* | (2006.01) |
| *H04N 1/028* | (2006.01) |
| *H04N 1/19* | (2006.01) |
| *H04N 1/12* | (2006.01) |
| *G02B 27/00* | (2006.01) |

(52) U.S. Cl.
CPC ....... *G02B 27/106* (2013.01); *G02B 27/0075* (2013.01); *H04N 1/028* (2013.01); *H04N 1/02815* (2013.01); *H04N 1/1255* (2013.01); *H04N 1/19* (2013.01); *H04N 2201/0438* (2013.01)

(58) Field of Classification Search
CPC .................................................... G02B 27/106
USPC ......................................................... 359/296
See application file for complete search history.

(56) References Cited

U.S. PATENT DOCUMENTS

| | | | |
|---|---|---|---|
| 5,537,163 A | 7/1996 | Ueno | |
| 2014/0210983 A1* | 7/2014 | Shimura | G02B 21/0016 348/80 |

FOREIGN PATENT DOCUMENTS

| | | |
|---|---|---|
| JP | H08-564 A | 1/1996 |
| JP | 2009205442 A | 9/2009 |
| JP | 2012098551 A | 5/2012 |
| JP | 2013044879 A | 3/2013 |

(Continued)

*Primary Examiner* — James C. Jones
(74) *Attorney, Agent, or Firm* — Canon U.S.A., Inc. IP Division

(57) ABSTRACT

An image forming optical system includes a first image forming unit configured to form an image of a first surface onto a second surface, a second image forming unit including at least a portion of the first image forming unit and configured to form an image of the second surface onto a third surface, and a deflection unit configured to deflect light from the second surface toward the third surface. The numerical aperture of the first image forming unit on the side toward the second surface is larger than the numerical aperture of the second image forming unit on the side toward the second surface.

19 Claims, 13 Drawing Sheets

(56) References Cited

FOREIGN PATENT DOCUMENTS

| | | |
|---|---|---|
| JP | 2015064550 A | 4/2015 |
| WO | 2015029365 A | 5/2015 |

* cited by examiner

[Fig. 1]
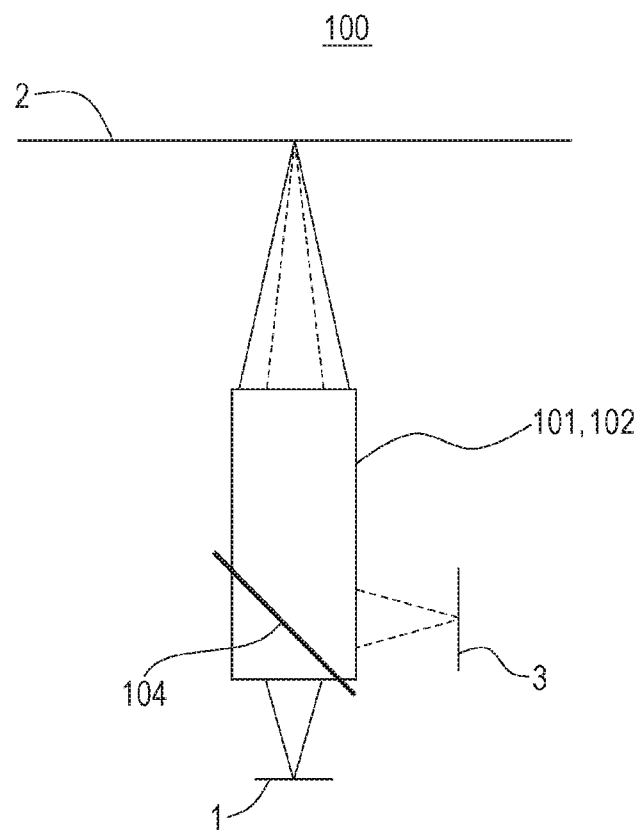

[Fig. 2]
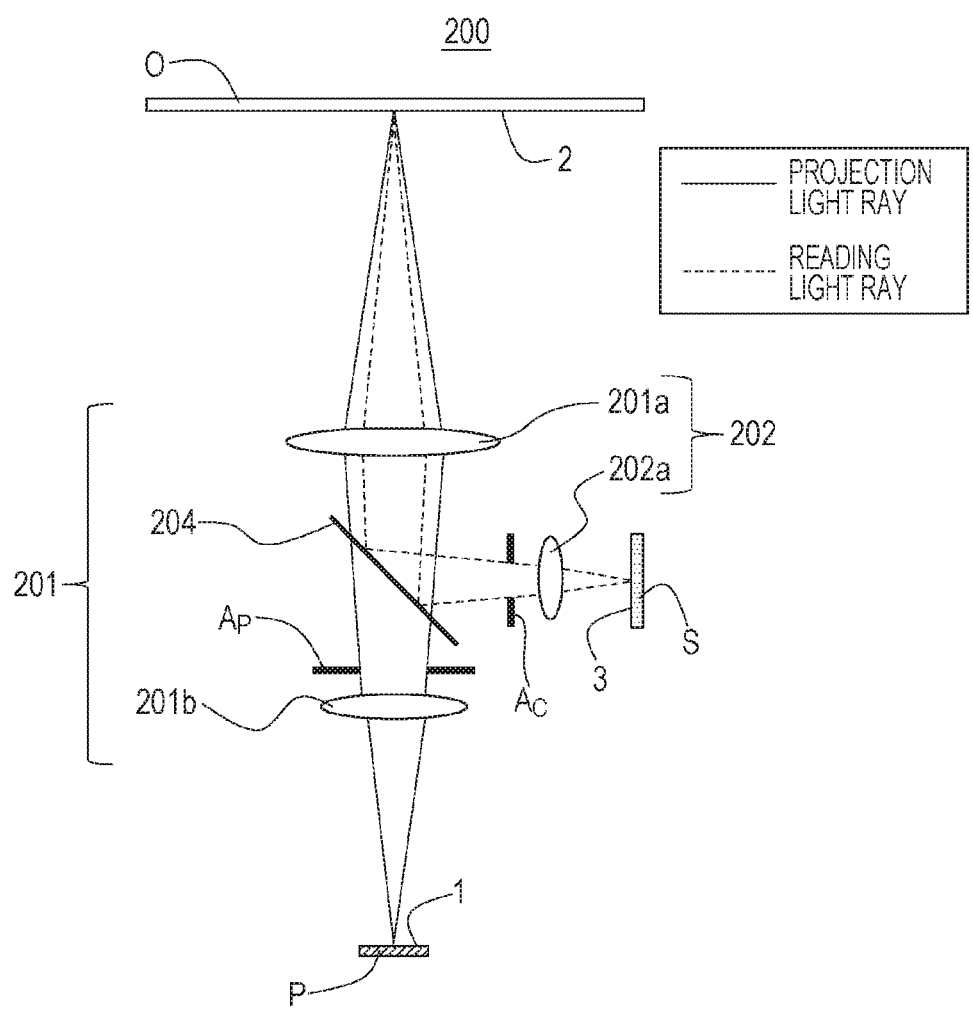

[Fig. 3]
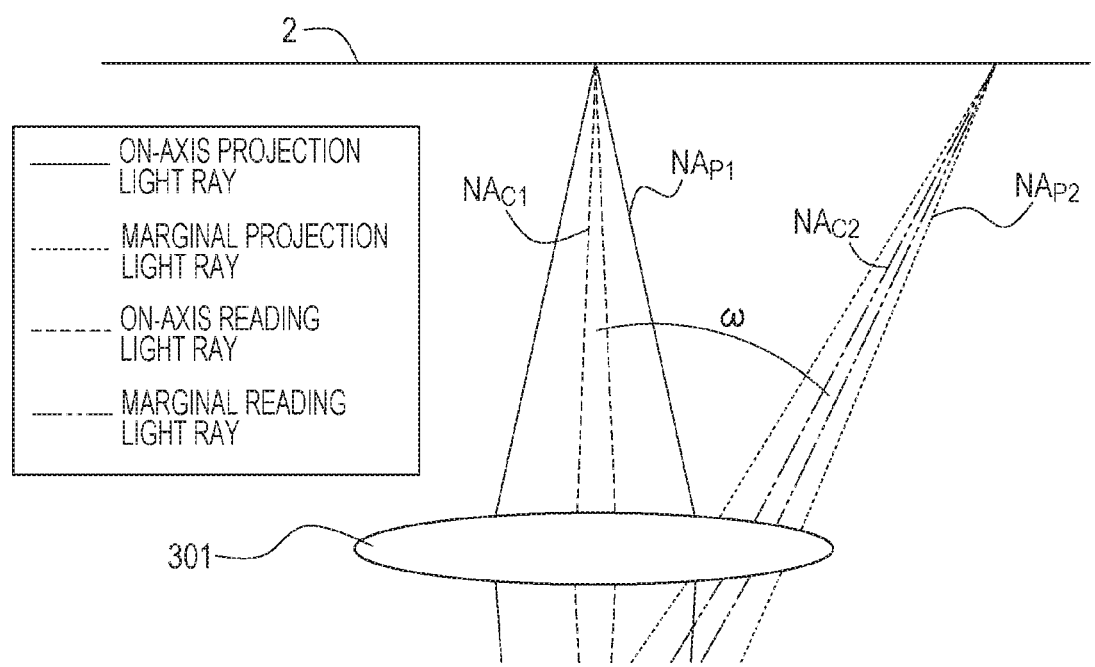

[Fig. 4]
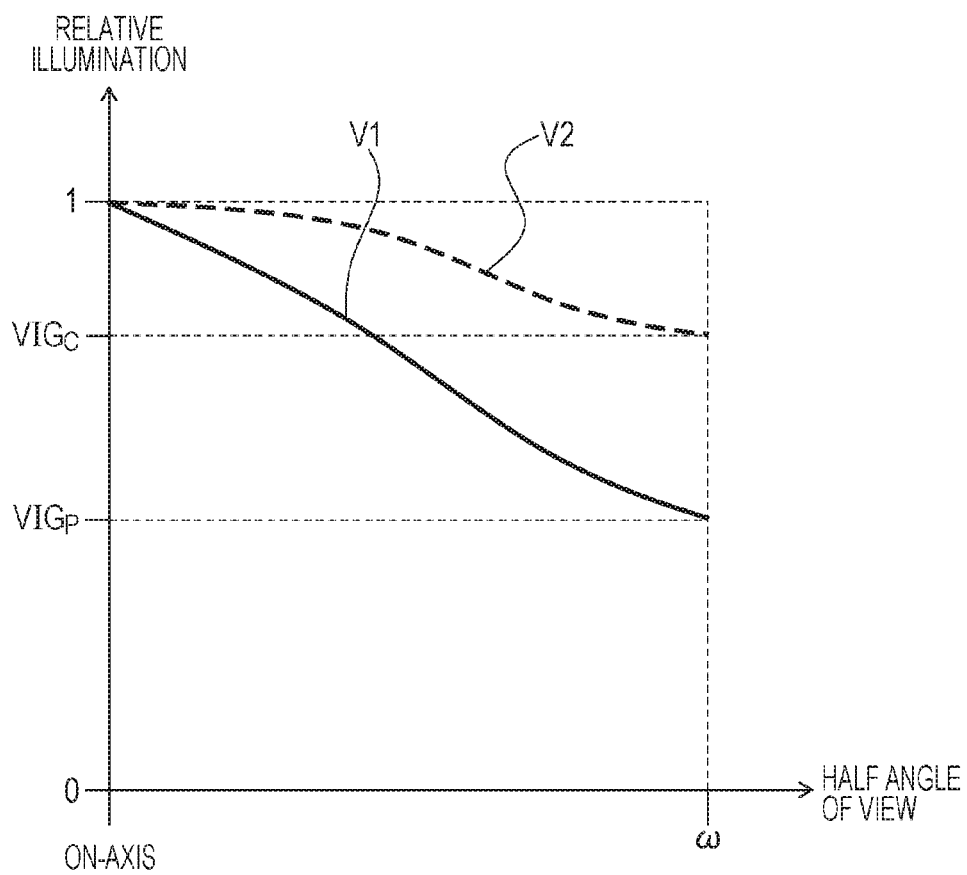

[Fig. 5]
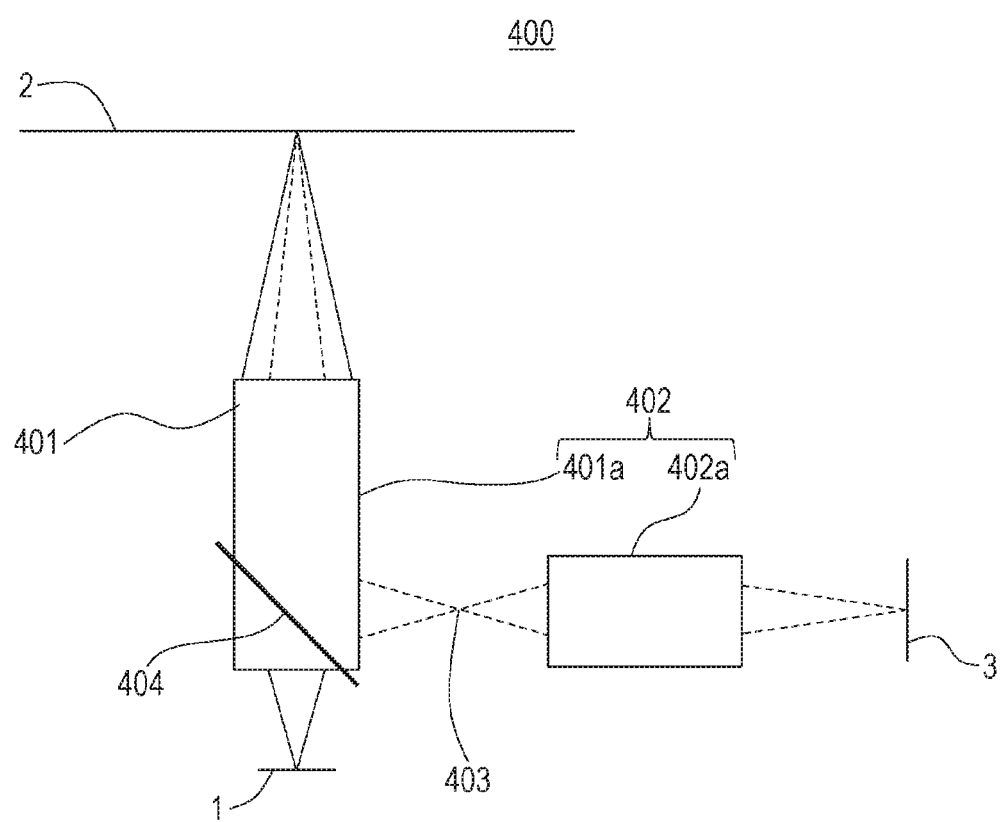

[Fig. 6]
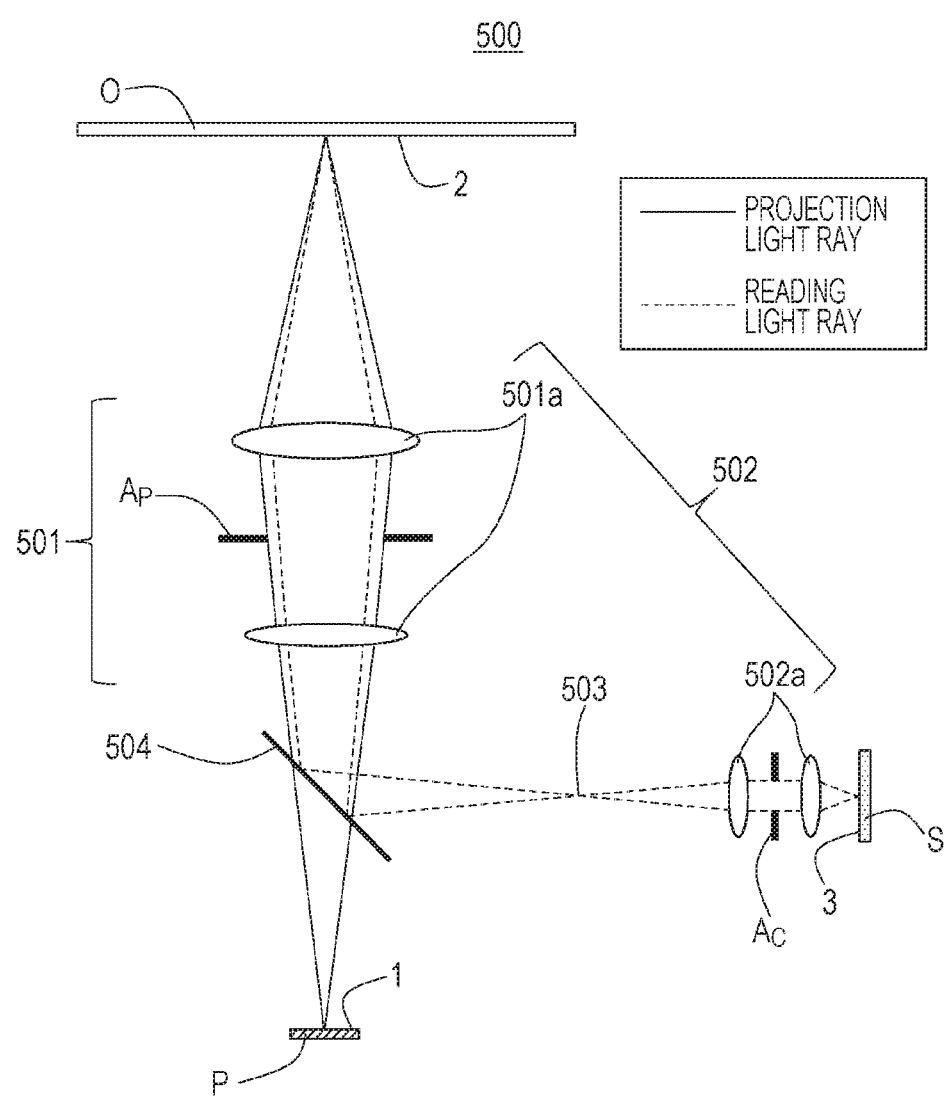

[Fig. 7A]
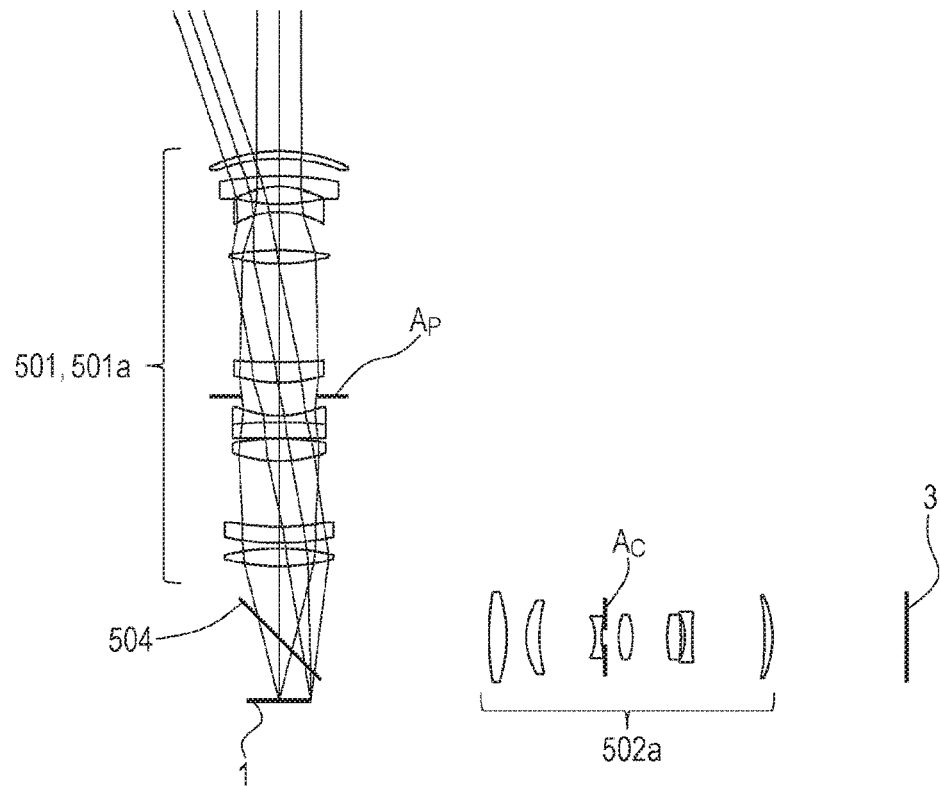
[Fig. 7B]
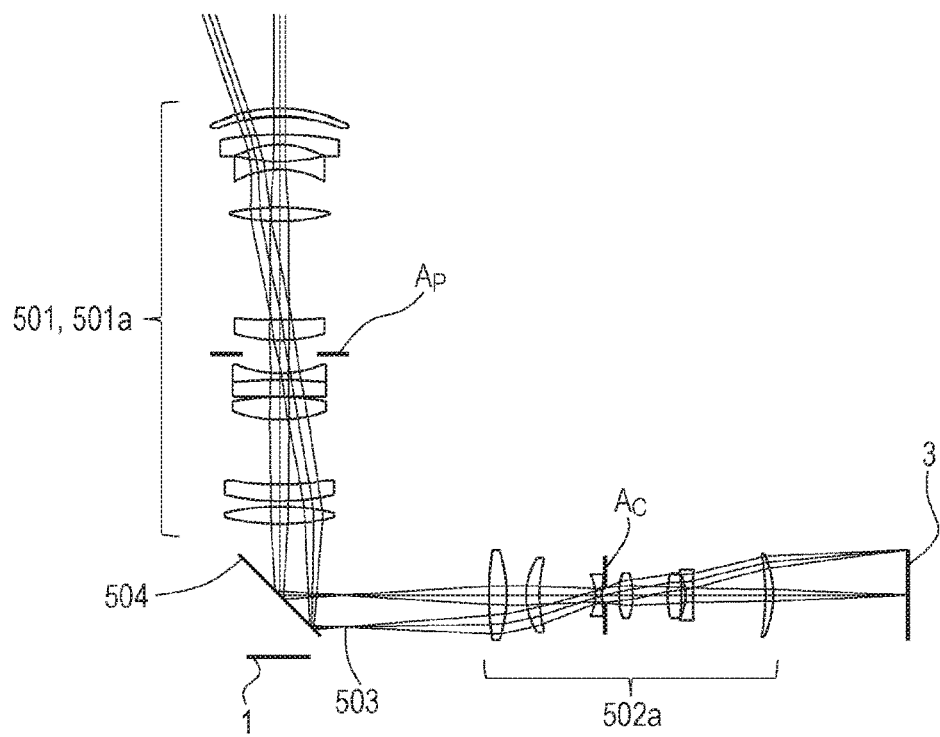

[Fig. 8A]
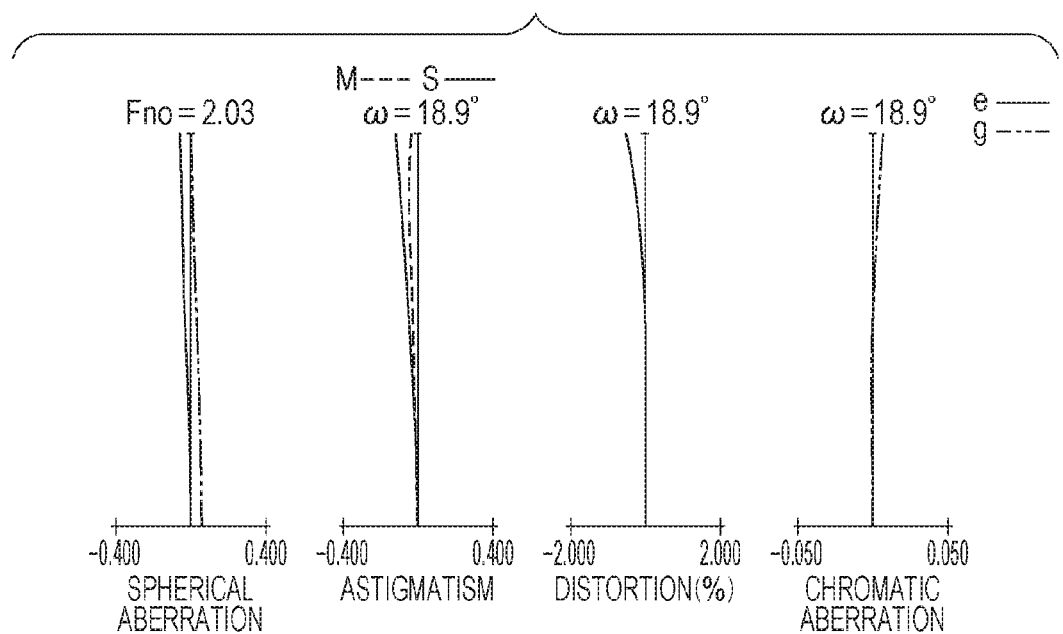
[Fig. 8B]
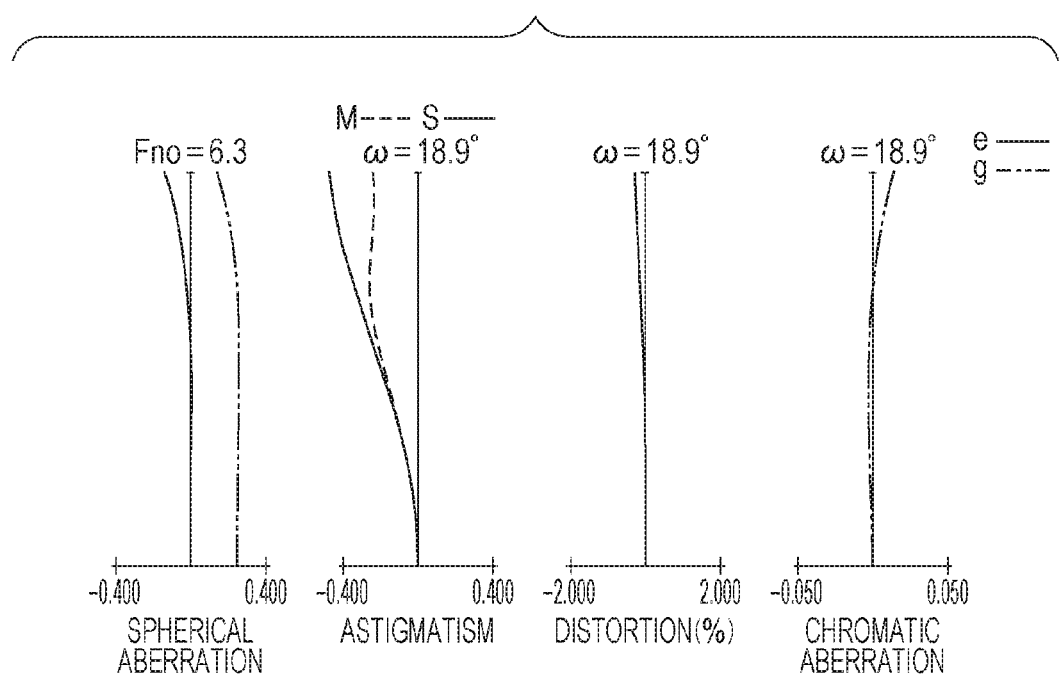

[Fig. 8C]
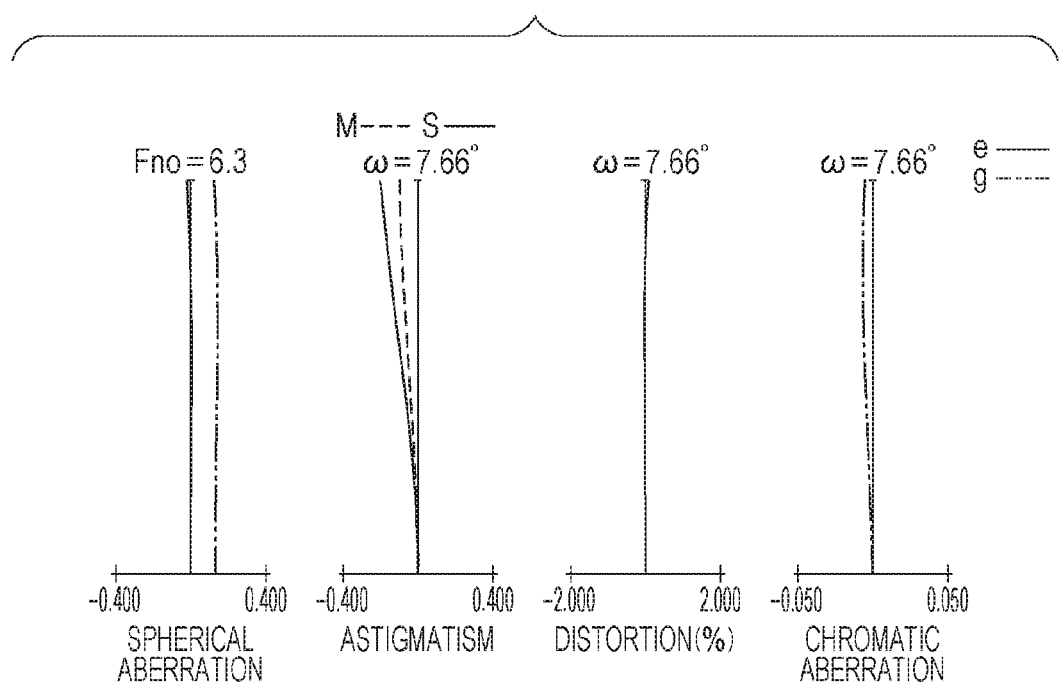

[Fig. 9A]
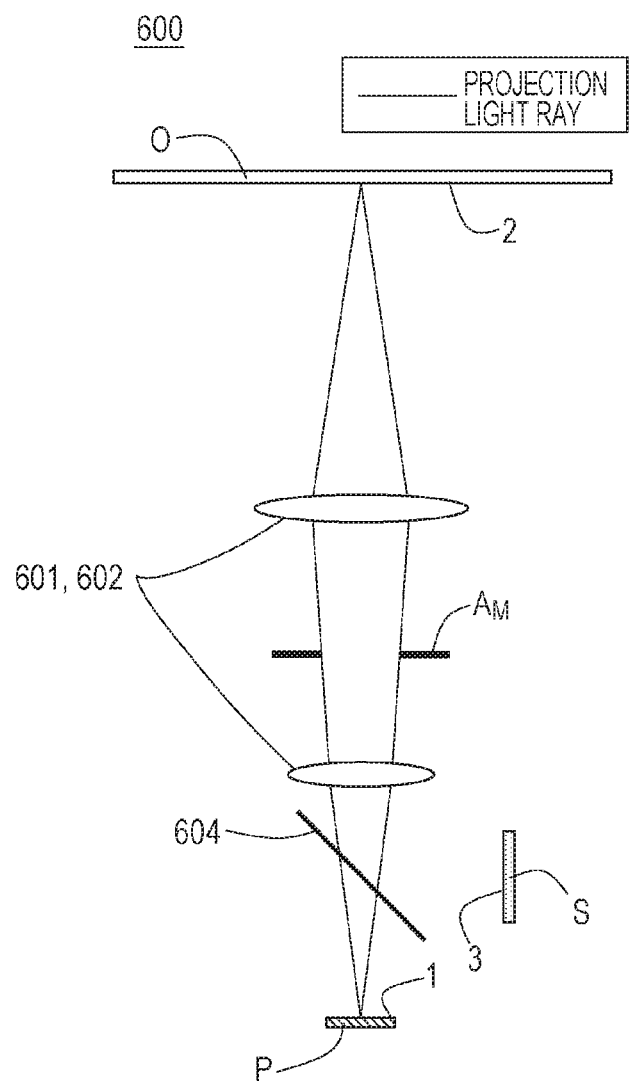

[Fig. 9B]
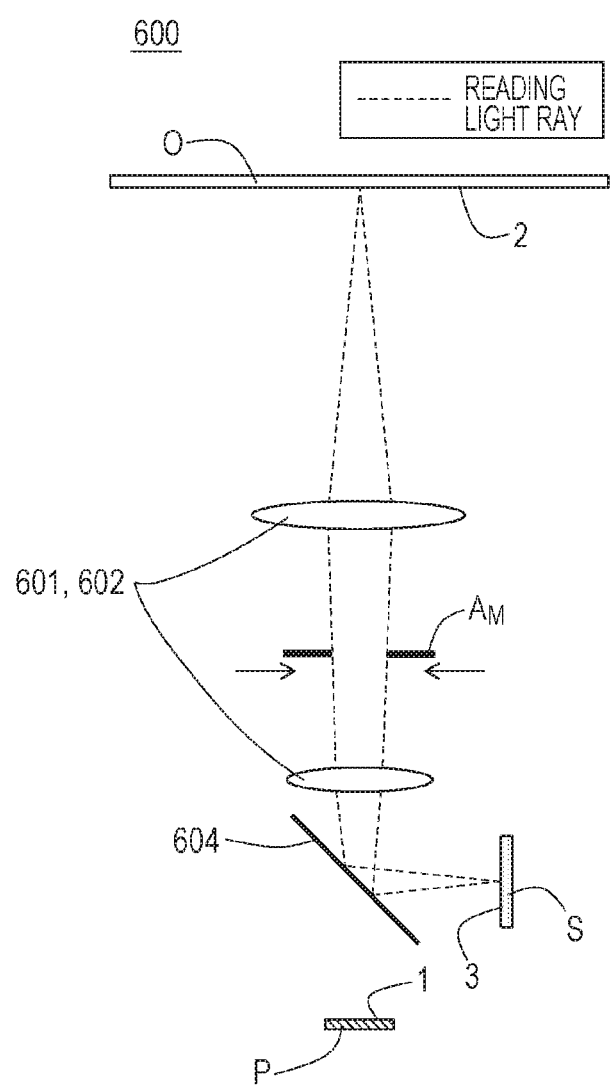

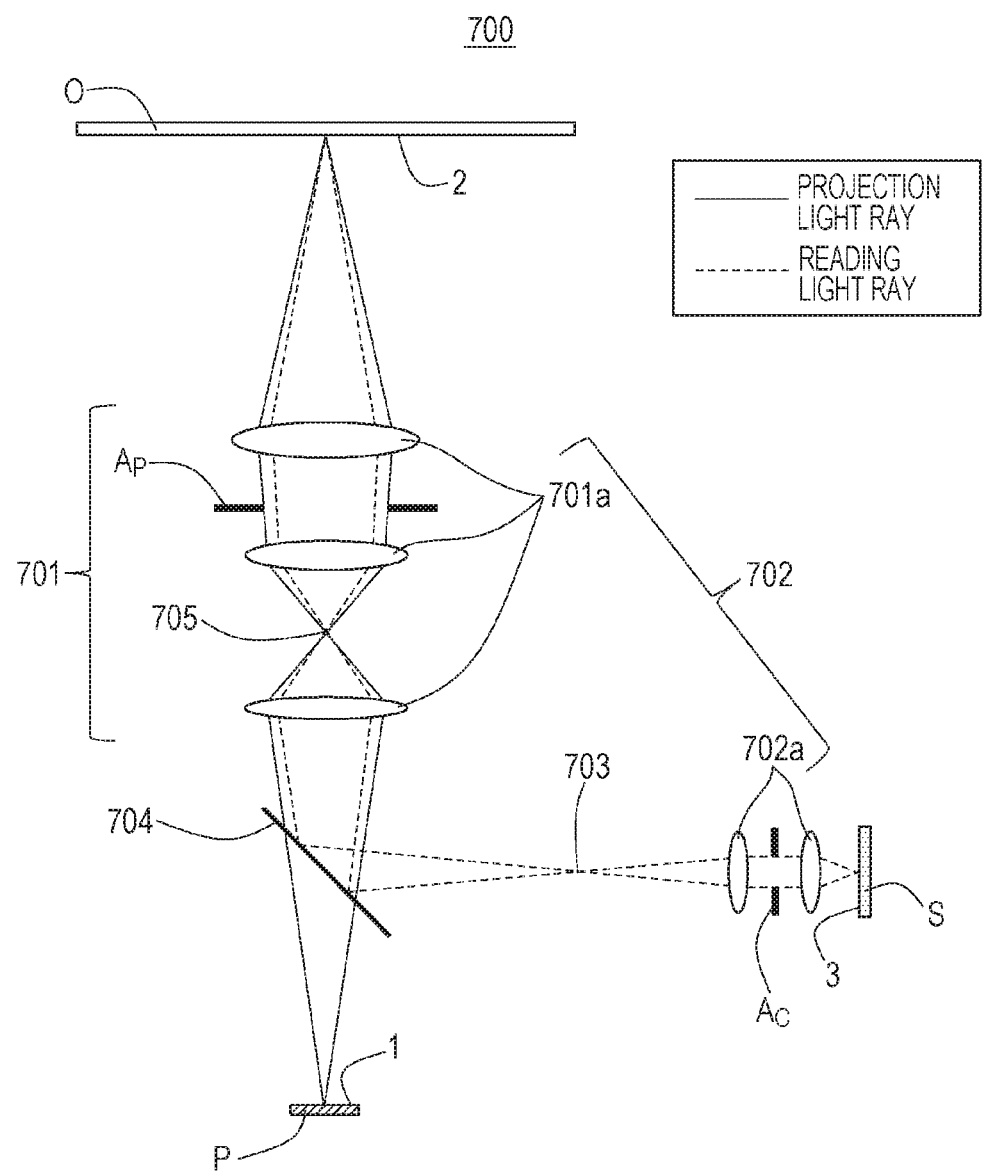
[Fig. 10]

[Fig. 11]
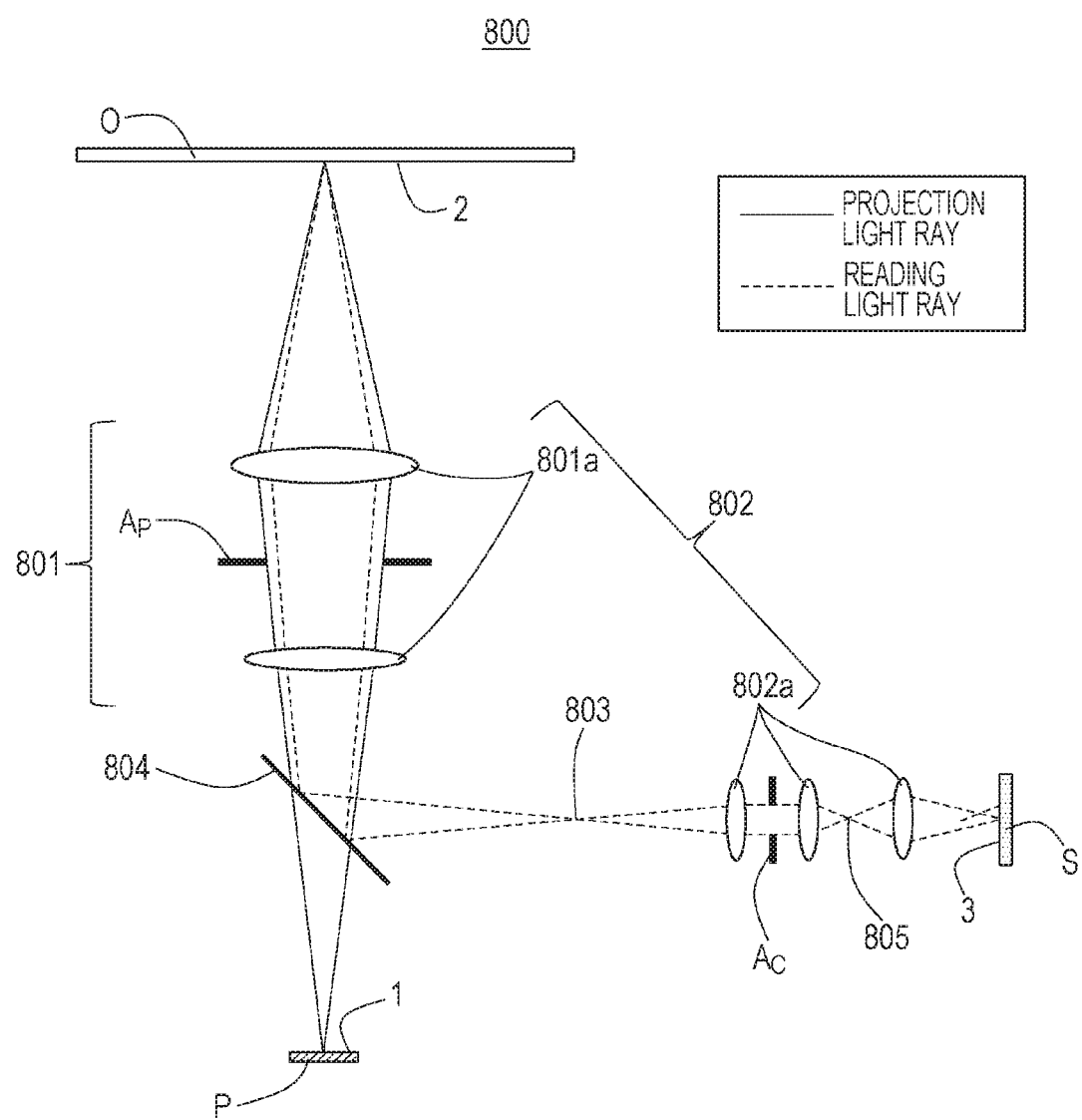

IMAGE FORMING OPTICAL SYSTEM AND IMAGE READING APPARATUS INCLUDING THE SAME

CROSS-REFERENCE TO RELATED APPLICATIONS

The present application is a National Phase application of International Patent Application No. PCT/JP2016/004209, filed Sep. 15, 2016, entitled "IMAGE FORMING OPTICAL SYSTEM AND IMAGE READING APPARATUS INCLUDING THE SAME", which claims priority to Japanese Patent Application No. 2015-194482, filed Sep. 30, 2015 and Japanese Patent Application No. 2015-194483, filed Sep. 30, 2015, all of which are hereby expressly incorporated by reference herein in their entirety.

TECHNICAL FIELD

The present invention relates to an image forming optical system for use in an image reading apparatus that includes a projection unit configured to project an image onto a projection surface and an image pickup unit configured to capture an image of the projection surface.

BACKGROUND ART

To date, known image reading apparatuses provided with both a projection unit configured to project an image onto a projection surface and an image pickup unit configured to capture an image of the projection surface include a projector equipped with an electronic blackboard function, a projector equipped with a camera that detects a distortion of a projected image, and a camera equipped with a projector that projects a captured image.

PTL 1 describes a projection apparatus equipped with an electronic blackboard function, and the stated projection apparatus can read an object on a screen with an image pickup unit while projecting an image on the screen with a projection unit. In the aforementioned apparatus, the projection unit and the image pickup unit share a portion of an optical system, and thus the size of the apparatus is prevented from being increased.

The apparatus described in PTL 1 faces a demand that a good image of the object on the screen be captured while projecting a bright image on the screen. In other words, the projection unit needs to secure a sufficient quantity of light, and the image pickup unit needs to secure a sufficient depth of field. However, according to the projection apparatus described in PTL 1, the projection unit and the image pickup unit share a portion of the optical system, and thus it is difficult to secure both the quantity of light for projecting an image and the depth of field for capturing an image.

CITATION LIST

Patent Literature

PTL 1: Japanese Patent Laid-Open No. 2009-205442

SUMMARY OF INVENTION

The present invention is directed to providing an image forming optical system that can secure both the quantity of light for projecting an image and the depth of field for capturing an image with a simple configuration and an image reading apparatus including such an image forming optical system.

An image forming optical system according to an aspect of the present invention includes a first image forming unit configured to form an image of a first surface onto a second surface, a second image forming unit including at least a portion of the first image forming unit and configured to form an image of the second surface onto a third surface, and a deflection unit configured to deflect light from the second surface toward the third surface. A numerical aperture of the first image forming unit on a side toward the second surface is larger than a numerical aperture of the second image forming unit on a side toward the second surface.

Further features of the present invention will become apparent from the following description of exemplary embodiments with reference to the attached drawings.

BRIEF DESCRIPTION OF DRAWINGS

FIG. 1 is a schematic diagram of a primary portion of an image forming optical system according to an exemplary embodiment of the present invention.

FIG. 2 is a schematic diagram of a primary portion of an image reading apparatus according to a first exemplary embodiment of the present invention.

FIG. 3 illustrates the numerical aperture of a projection optical system and the numerical aperture of an image pickup optical system.

FIG. 4 illustrates the relative illumination of the projection optical system and the relative illumination of the image pickup optical system.

FIG. 5 is a schematic diagram of a primary portion of an image forming optical system according to a second exemplary embodiment of the present invention.

FIG. 6 is a schematic diagram of a primary portion of an image reading apparatus according to a third exemplary embodiment of the present invention.

FIG. 7A is a schematic diagram of a primary portion of an image forming optical system according to a numerical example of the third exemplary embodiment.

FIG. 7B is a schematic diagram of a primary portion of an image forming optical system according to a numerical example of the third exemplary embodiment.

FIG. 8A is an aberration diagram of an image forming optical system according to a numerical example of the third exemplary embodiment.

FIG. 8B is an aberration diagram of an image forming optical system according to a numerical example of the third exemplary embodiment.

FIG. 8C is an aberration diagram of an image forming optical system according to a numerical example of the third exemplary embodiment.

FIG. 9A is a schematic diagram of a primary portion of an image reading apparatus according to a fourth exemplary embodiment of the present invention.

FIG. 9B is a schematic diagram of a primary portion of the image reading apparatus according to the fourth exemplary embodiment of the present invention.

FIG. 10 is a schematic diagram of a primary portion of an image reading apparatus according to a fifth exemplary embodiment of the present invention.

FIG. 11 is a schematic diagram of a primary portion of an image reading apparatus according to a sixth exemplary embodiment of the present invention.

DESCRIPTION OF EMBODIMENTS

Hereinafter, exemplary embodiments of the present invention will be described with reference to the drawings.

It is to be noted that the drawings may be depicted in scales different from the actual scales for convenience. In addition, in the drawings, identical members are given identical reference characters, and duplicate descriptions thereof will be omitted.

FIG. 1 is a schematic diagram (sectional view containing an optical axis) of a primary portion of an image forming optical system 100 according to an exemplary embodiment of the present invention. The image forming optical system 100 includes a first image forming unit 101 configured to form an image of a first surface 1 onto a second surface 2, a second image forming unit 102 configured to form an image of the second surface 2 onto a third surface 3, and a deflection unit (splitting unit) 104 configured to deflect (split) a light beam (optical path) from the second surface 2 toward the third surface 3.

In FIG. 1, the solid lines indicate effective light rays (marginal light rays on the axis) that contribute to image formation of the first image forming unit 101, and the dashed lines indicate effective light rays (marginal light rays on the axis) that contributes image formation of the second image forming unit 102. It is to be noted that FIG. 1 depicts the first image forming unit 101 and the second image forming unit 102 in a simplified form, and light rays passing therethrough are omitted.

The image forming optical system 100 according to the present exemplary embodiment is configured such that the second image forming unit 102 includes at least a portion of the first image forming unit 101, and thus the size of the entire system can be reduced (simplified). In addition, according to the present exemplary embodiment, the numerical aperture of the first image forming unit 101 on the side toward the second surface 2 is larger than the numerical aperture of the second image forming unit 102 on the side toward the second surface 2. With this configuration, the first image forming unit 101 can secure a sufficient quantity of light, and the second image forming unit 102 can secure a sufficient depth of field.

Hereinafter, exemplary embodiments in which the image forming optical system 100 according to the present exemplary embodiment is applied to an image reading apparatus will be described in detail.

First Exemplary Embodiment

FIG. 2 is a schematic diagram of a primary portion of an image reading apparatus 200 (image projection apparatus) according to a first exemplary embodiment of the present invention. The image reading apparatus 200 includes a projection unit configured to project an image displayed on a display surface 1 (first surface) onto a projection surface 2 (second surface) of a screen O and an image pickup unit (reading unit) configured to capture an image of at least one of the image projected on the projection surface 2 and an object placed on the projection surface 2.

Specifically, the projection unit according to the present exemplary embodiment includes a display element P (display panel) configured to display an image and a projection optical system 201 (first image forming unit) configured to form an enlarged image of the display surface 1 of the display element P onto the projection surface 2. The display element P can be constituted by a liquid crystal display (LCD), a liquid crystal on silicon, (LCOS), a digital mirror device (DMD), or the like. The projection optical system 201 includes a plurality of optical elements 201a and 201b and a first aperture stop $A_P$ disposed in an optical path between the display surface 1 and the projection surface 2.

The image pickup unit according to the present exemplary embodiment includes an image pickup element S (sensor) configured to capture an image of the projection surface 2 and an image pickup optical system 202 (second image forming unit) configured to form a reduced image of the projection surface 2 onto an imaging surface 3 (third surface) of the image pickup element S. The image pickup element S can be constituted by a charge coupled device (CCD) sensor, a complementary metal oxide semiconductor (CMOS) sensor, or the like. The image pickup optical system 202 includes the optical element 201a, which constitutes the projection optical system 201, a second aperture stop $A_C$, and an optical element 202a.

In this manner, according to the present exemplary embodiment, the image forming optical system is constituted by the projection optical system 201 and the image pickup optical system 202. The image forming optical system according to the present exemplary embodiment further includes a deflection unit 204 configured to deflect light from the projection surface 2 toward the imaging surface 3. The deflection unit 204 can be constituted by an optical element, such as a semi-transmissive filter, a polarization filter, or a dichroic mirror. Alternatively, a movable reflection member (reflection mirror or the like) may be employed for the deflection unit 204, and the reflection member may be disposed in the optical path of the projection optical system 201 only when an image is captured so as to form the optical path indicated by the dashed lines. It is to be noted that the aforementioned optical element, such as the semi-transmissive filter, may be employed as the movable reflection member.

The projection unit first displays an image on the display surface 1 of the display element P on the basis of an image processing signal from a control device (not illustrated). Then, the projection unit condenses the light (projection light rays) from the display surface 1 with the projection optical system 201 and projects the image displayed on the display surface 1 onto the projection surface 2, as indicated by the solid lines in FIG. 2. Meanwhile, the image pickup unit condenses the light (reading light rays) from the projection surface 2 with the image pickup optical system 202 and forms an image of the projection surface 2 onto the imaging surface 3, as indicated by the dashed lines in FIG. 2. At this point, an object (document) may be placed on the projection surface 2, and the image pickup unit can capture an image of at least one of the image projected on the projection surface 2 and the object placed on the projection surface 2.

In the image reading apparatus 200 according to the present exemplary embodiment, a portion (the optical element 201a) of the projection optical system 201 is shared with the image pickup optical system 202, and thus the reduction in the size (simplification) of the entire system of the image forming optical system can be achieved. In addition, the aperture diameter (stop diameter) of the first aperture stop $A_P$ is made larger than the aperture diameter of the second aperture stop $A_C$, and thus the numerical aperture of the projection optical system 201 on the side toward the projection surface 2 (the numerical aperture on the enlargement side) is made larger than the numerical aperture of the image pickup optical system 202 on the side toward the projection surface 2. With this configuration, a sufficient quantity of light is secured when the projection unit projects an image, and a sufficient depth of field can be secured when the image pickup unit reads an image (detailed descriptions will be given later).

Although a portion of the projection optical system 201 is shared with the image pickup optical system 202 in the image forming optical system according to the present exemplary embodiment, this is not a limiting example. For example, the deflection unit 204 may be disposed in an optical path between the display surface 1 and the projection optical system 201, and thus the entire projection optical system 201 may be shared with the image pickup optical system 202. In addition, the number and the arrangement of the optical elements constituting the projection optical system 201 and the image pickup optical system 202 are not limited to those illustrated in FIG. 2, and the projection optical system 201 and the image pickup optical system 202 may be designed as appropriate in accordance with the required optical performance. Although lenses are employed as the optical elements in the present exemplary embodiment, this is not a limiting example, and other optical elements, such as a mirror and a prism, may also be used.

The arrangement of the first aperture stop $A_P$ and the second aperture stop $A_C$ is not limited to the arrangement illustrated in FIG. 2. For example, the first aperture stop $A_P$ may be disposed in an optical path between the display surface 1 and the optical element 201b, in an optical path between the deflection unit 204 and the optical element 201a, in an optical path between the optical element 201a and the projection surface 2, or the like. In addition, the second aperture stop $A_C$ may be disposed in an optical path between the optical element 202a and the imaging surface 3. When the first aperture stop $A_P$ is disposed in an optical path between the display surface 1 and the optical element 201b, depending on the position of the first aperture stop $A_P$, the numerical aperture of the projection optical system 201 on the enlargement side may become larger than that of the image pickup optical system 202 even if the aperture diameter of the first aperture stop $A_P$ is set to be smaller than the aperture diameter of the second aperture stop $A_C$.

Numerical Aperture

Next, the numerical apertures of the projection optical system and of the image pickup optical system will be described in detail.

Typically, the depth of field D of an image forming optical system is expressed through the following expression (1), in which f represents the focal length, NA represents the numerical aperture, L represents the object distance, and δ represents the diameter of a permissible circle of confusion.

[Math. 1]

$$D = \frac{\delta L^2}{(2NAf^2 + \delta L)} + \frac{\delta L^2}{(2NAf^2 - \delta L)} \quad (1)$$

It can be seen from the expression (1) that the depth of field increases as the numerical aperture decreases. Thus, in order to obtain a good captured image regardless of the thickness of the object, it is preferable that the numerical aperture of the image pickup optical system on the side toward the object (the numerical aperture on the enlargement side) be small. In addition, an image formed on the projection surface becomes brighter in proportion to the square of the numerical aperture. Thus, in order to project a bright image on the projection surface, it is preferable that the numerical aperture of the projection optical system on the enlargement side be large. Accordingly, by designing the first and second aperture stops such that the numerical aperture of the projection optical system on the enlargement side is larger than the numerical aperture of the image pickup optical system on the enlargement side, a sufficient quantity of light can be secured for projecting an image, a sufficient depth of field can be secured for capturing an image.

FIG. 3 illustrates a relationship between the numerical aperture of the projection optical system and the numerical aperture of the image pickup optical system. FIG. 3 illustrates projection light rays from an optical element 301, which is shared by the projection optical system and the image pickup optical system, to the projection surface 2 and reading light rays from the projection surface 2 to the optical element 301. With respect to the reading light rays, light rays on the optical axis of the image pickup optical system (on-axis principal rays) and outermost off-axis light rays (marginal rays) are indicated, and the angle formed by the on-axis principal rays and the outermost off-axis principal rays, or in other words, the maximum half angle of view of the image pickup optical system is represented by ω. In addition, with respect to the projection light rays, light rays on the optical axis of the projection optical system and light rays at an image height corresponding to the outermost off-axis light rays of the image pickup optical system are indicated.

As can be seen from FIG. 3, the numerical aperture $NA_{P1}$ of the projection optical system on the enlargement side on the optical axis (on-axis numerical aperture) is larger than the numerical aperture $NA_{C1}$ of the image pickup optical system on the enlargement side on the optical axis. In addition, the numerical aperture $NA_{P2}$ of the projection optical system on the enlargement side in the meridional direction at the maximum half angle of view ω (marginal numerical aperture) is larger than the numerical aperture $NA_{C2}$ of the image pickup optical system on the enlargement side in the meridional direction at the maximum half angle of view ω.

Here, it is desirable that the on-axis numerical aperture and the marginal numerical aperture of the image pickup optical system satisfy the following conditional expression (2).

[Math. 2]

$$0.7 \leq \frac{NA_{C2}}{NA_{C1}} \leq 1 \quad (2)$$

As the conditional expression (2) is satisfied, the difference between the on-axis numerical aperture and the marginal numerical aperture of the image pickup optical system can be reduced to a sufficient level, and a high resolution can be obtained through the on-axis to the outermost off-axis. When the conditional expression (2) is not satisfied, the difference between the on-axis numerical aperture and the marginal numerical aperture of the image pickup optical system becomes large, and it becomes difficult to obtain a high resolution through the on-axis to the outermost off-axis. Furthermore, it is desirable that the following conditional expression (3) be satisfied.

[Math. 3]

$$0.8 \leq \frac{NA_{C2}}{NA_{C1}} \leq 1 \quad (3)$$

In addition, it is desirable that the on-axis numerical aperture and the marginal numerical aperture of the projection optical system and the on-axis numerical aperture of the image pickup optical system satisfy the following conditional expression (4). As the conditional expression (4) is satisfied, the loss of the quantity of light for projecting an image can be reduced, and a sufficient depth of field can be secured for capturing an image.

[Math.4]

$$NA_{C1} \leq NA_{P2} < NA_{P1} \quad (4)$$

Relative Illumination

FIG. 4 illustrates the ratio of the quantity of light (brightness) of marginal rays (off-axis rays) to the quantity of light of on-axis rays (relative illumination) in the projection optical system and in the image pickup optical system, in which the quantity of light of marginal rays is indicated with the quantity of light of on-axis rays being considered as 1. In FIG. 4, the solid line V1 indicates the relative illumination for a range from the on-axis to the maximum half angle of view ω in the projection optical system, and the dashed line V2 indicates the relative illumination for a range from the on-axis to the maximum half angle of view ω in the image pickup optical system.

Here, it is desirable that the following conditional expression (5) be satisfied, in which $VIG_P$ represents the relative illumination of the projection optical system at the maximum half angle of view ω, and $VIG_C$ represents the relative illumination of the image pickup optical system at the maximum half angle of view ω.

[Math. 5]

$$1.2 \leq \frac{VIG_C}{VIG_P} \quad (5)$$

As the conditional expression (5) is satisfied, the difference between the quantity of on-axis light and the quantity of marginal light in the image pickup optical system can be reduced to a sufficient level, and a high resolution can be obtained through the on-axis to the outermost off-axis. When the ratio falls below the lower limit of the conditional expression (5), the difference between the quantity of on-axis light and the quantity of marginal light in the image pickup optical system becomes large, and it becomes difficult to obtain a high resolution through the on-axis to the outermost off-axis. Furthermore, it is desirable that the following conditional expression (6) be satisfied.

[Math. 6]

$$1.4 \leq \frac{VIG_C}{VIG_P} \quad (6)$$

Second Exemplary Embodiment

FIG. 5 is a schematic diagram (sectional view containing an optical axis) of a primary portion of an image forming optical system 400 according to an exemplary embodiment of the present invention. The image forming optical system 400 includes a first image forming unit 401 configured to form an image of the first surface 1 onto the second surface 2 and a second image forming unit 402 configured to form an image of the second surface 2 onto the third surface 3.

The second image forming unit 402 includes an intermediate image forming unit 401a constituted by at least a portion of the first image forming unit 401 and configured to form an intermediate image 403 of the second surface 2 and an image re-forming unit 402a configured to re-form an image of the intermediate image 403 onto the third surface 3. In addition, a deflection unit 404 (splitting unit) configured to deflect (split) a light beam (optical path) from the second surface 2 is disposed in an optical path between the intermediate image forming unit 401a and the intermediate image 403.

In this manner, the image forming optical system 400 is configured such that the first image forming unit 401 and the second image forming unit 402 share at least a portion (intermediate image forming unit 401a) thereof, and thus the reduction in the size (simplification) of the entire system is achieved. In addition, at least a portion of the image forming optical system 400 is configured such that light deflected by the deflection unit 404 forms the intermediate image 403 before the light is condensed on the third surface 3, which is the image plane of the second image forming unit 402. In other words, in the image forming optical system 400, the aberration can be corrected independently in the intermediate image forming unit 401a and in the image re-forming unit 402a (upstream and downstream from intermediate image 403), and the aberration in the first image forming unit 401 and the aberration in the second image forming unit 402 can both be suppressed in a favorable manner.

Third Exemplary Embodiment

FIG. 6 is a schematic diagram of a primary portion of an image reading apparatus 500 according to a third exemplary embodiment of the present invention. The image reading apparatus 500 has a configuration similar to that of the image reading apparatus 200 according to the first exemplary embodiment except in that an image pickup optical system 502 forms an image of the projection surface 2 twice.

A projection optical system 501 according to the present exemplary embodiment forms an image of the display surface 1 only once, as in the first exemplary embodiment. Meanwhile, unlike the first exemplary embodiment, the image pickup optical system 502 forms an image of the projection surface 2 once (intermediate image formation) and then re-forms an image of the projection surface 2 onto the imaging surface 3. Specifically, the image pickup optical system 502 includes an intermediate image forming unit 501a configured to form an intermediate image 503 of the projection surface 2, the second aperture stop $A_C$ disposed in an optical path between the intermediate image 503 and the imaging surface 3, and an image re-forming unit 502a configured to re-form an image of the intermediate image 503 onto the imaging surface 3. In addition, a deflection unit 504 configured to deflect a light beam from the projection surface 2 is disposed in an optical path between the intermediate image forming unit 501a and the intermediate image 503. Each of the intermediate image forming unit 501a and the image re-forming unit 502a is constituted by a plurality of optical elements (lenses).

In the present exemplary embodiment, the image forming magnification of the projection optical system 501 and the image forming magnification of the image pickup optical system 502 differ from each other. Specifically, in the present exemplary embodiment, the image pickup element S having a larger size than the display element P is employed.

Thus, the image re-forming unit 502a is configured as an enlargement system, and an enlarged image of the intermediate image 503 is formed on the image pickup element S.

In this manner, the image reading apparatus 500 according to the present exemplary embodiment is configured such that the intermediate image forming unit 501a forms the intermediate image 503 of the projection surface 2 via the deflection unit 504, and thus an independent optical design can be employed upstream and downstream from the intermediate image 503. Accordingly, even in a configuration in which the image forming magnification of the projection optical system 501 and the image forming magnification of the image pickup optical system 502 differ from each other, the aberration in the projection optical system 501 and the aberration in the image pickup optical system 502 can each be corrected independently, and good optical performance can be obtained.

In addition, according to the present exemplary embodiment, the deflection unit 504 is disposed between the display surface 1 and the projection optical system 501 (intermediate image forming unit 501a), and the entire projection optical system 501 is used as a portion of the image pickup optical system 502. Therefore, the number of times the projection optical system 501 forms an image is equal to the number of times the intermediate image forming unit 501a forms an image and is less than the number of times the image pickup optical system 502 forms an image. Thus, the aberration in the projection optical system 501 and the aberration in the image pickup optical system 502 can be suppressed with a simpler configuration.

It is to be noted that the number and the arrangement of the optical elements constituting the projection optical system 501 and the image pickup optical system 502 are not limited to those illustrated in FIG. 6, and the projection optical system 501 and the image pickup optical system 502 may be designed as appropriate in accordance with the required optical performance. For example, the projection optical system 501 may further include an optical element disposed in an optical path between the display surface 1 and the deflection unit 504, and the intermediate image forming unit 501a may further include an optical element disposed between the deflection unit 504 and the intermediate image 503.

The arrangement of the first aperture stop $A_P$ and the second aperture stop $A_C$ according to the present exemplary embodiment is not limited to the arrangement illustrated in FIG. 6, either. For example, the first aperture stop $A_P$ may be disposed in an optical path between the intermediate image forming unit 501a and the projection surface 2, in an optical path between the intermediate image forming unit 501a and the deflection unit 504, in an optical path between the deflection unit 504 and the display surface 1, or the like. In addition, the second aperture stop $A_C$ may be disposed in an optical path between the intermediate image 503 and the image re-forming unit 502a, in an optical path between the image re-forming unit 502a and the imaging surface 3, or the like.

The image pickup optical system 502 may be provided with a mechanism for focusing in accordance with a change in the position of an image pickup target (the projection surface 2 or an object placed on the projection surface 2) in the optical axis direction, or in other words, a change in the position of the intermediate image 503. Specifically, focusing can be achieved in accordance with a change in the position of the intermediate image 503 by driving at least one of the optical elements constituting the image re-forming unit 502a in the optical axis direction.

Numerical Example

Hereinafter, a numerical example (lens data) of the image forming optical system according to the present exemplary embodiment is illustrated. FIGS. 7A and 7B are schematic diagrams of a primary portion of the image forming optical system according to the present numerical example. FIG. 7A illustrates an optical path of the projection light rays for projecting an image, and FIG. 7B illustrates an optical path of the reading light rays for capturing an image. Although lenses are employed as the optical elements constituting the image forming optical system in the present numerical example, this is not a limiting example, and other optical elements, such as a mirror and a prism, may also be used. In the present numerical example, $NA_{P1}=0.25$, $NA_{P2}=0.14$, $NA_{C1}=NA_{C2}=0.08$, and $VIG_C/VIG_P=1.83$. In addition, the conditional expressions (2) through (6) described above are all satisfied.

With regard to the following lens data, the surface number indicates the numerical location (i) of a given surface counted from the light-incident side, R represents the radius of curvature of the ith optical surface (the ith surface), and D represents the surface distance between the ith surface and the (i+1)th surface (distance along the optical axis). Nd and vd represent the refractive index and the Abbe number, respectively, of the ith surface with respect to the d-line. In addition, f represents the focal length, β represents the reduction magnification, and ω represents the angle of view.

In the lens data, an optical surface having an aspherical surface shape is indicated by adding*(asterisk) following the surface number. In addition, E-N in each of the aspherical coefficients means×$10^{-N}$. The aspherical surface shape of an optical surface is expressed through the following expression (7) in which H(r) represents the amount of displacement from the surface vertex in the optical axis direction, r represents the height from the optical axis in the direction perpendicular to the optical axis direction, R represents the paraxial radius of curvature, and C represents the aspherical coefficients.

[Math. 7]

$$H(r) = \frac{r^2/R}{1+\sqrt{1-(r^2/R^2)}} + C_4 r^4 + C_6 r^6 + C_8 r^8 + C_{10} r^{10} + C_{12} r^{12} \quad (7)$$

Projection Optical System 501
surface data
surface number R D Nd vd
1 49.63 2.41 1.487 70.23
2 * 54.51 5.52 1
3 100.63 3.21 1.487 70.23
4 * 26.98 5.29 1
5 −58.60 2.54 1.487 70.23
6 28.18 11.99 1
7 89.93 4.28 1.816 46.62
8 −56.77 30.92 1
9 −191.25 6.38 1.648 53.02
10 −47.26 4.36 1
aperture stop ∞ 6.02 1
12 −33.94 2.04 1.785 26.29
13 162.27 5.10 1.603 65.44
14 ∞ 0.10 1
15 82.44 7.08 1.487 70.23
16 −41.77 20.34 1
17 * −102.92 5.16 1.487 70.23

18 −78.00 1.77 1
19 75.50 5.49 1.595 67.74
20 −68.72 41.80 1
aspherical coefficient
surface number 2
C4 C6 C8 C10 C12
−2.24E−06 4.62E−09 7.10E−12 8.51E−16 0
surface number 4
C4 C6 C8 C10 C12
−2.53E−06−7.04E−09−1.81E−10 4.38E−13−7.20E−16
surface number 17
C4 C6 C8 C10 C12
−5.21E−06 1.70E−09−5.56E−11 2.87E−13−5.38E−16
f 29.5 mm
F-number 2.03
β −0.0178
ω 18.70
Image Re-Forming Unit 502a
surface data
surface number R D Nd vd
1 95.18 5.49 1.595 67.74
2 −45.91 6.15 1
3 21.28 4.16 1.603 65.44
4 44.06 17.59 1
5 −13.92 2.04 1.699 30.13
6 20.72 1.00 1
aperture stop ∞4.36 1
8 21.47 4.38 1.595 67.74
9 −19.95 10.92 1
10 34.83 4.28 1.850 32.27
11 −67.69 1.41 1
12 −14.33 2.21 1.673 32.10
13 194.82 22.62 1
14 −67.91 2.41 1.850 32.27
15 −31.73 42.16 1
f 89.3 mm
F-number 6.3
β −1.43
ω 7.66°

FIGS. 8A, 8B, and 8C illustrate aberration diagrams of the image forming optical system according to the present numerical example. FIG. 8A illustrates an aberration diagram of the projection optical system 501 (for projecting an image). FIG. 8B illustrates an aberration diagram of the image pickup optical system 502 (for capturing an image), and FIG. 8C illustrates an aberration diagram of the image re-forming unit 502a. The solid line in each of the spherical aberration diagrams corresponds to the e-line, and the dashed-two-dotted line corresponds to the g-line. In addition, the solid line S in each of the astigmatism diagrams corresponds to the e-line (sagittal direction), and the dashed line M corresponds to the e-line (meridional direction). The dashed-two-dotted line g in each of the chromatic aberration diagrams corresponds to the g-line.

Fourth Exemplary Embodiment

FIGS. 9A and 9B are schematic diagrams of a primary portion of an image reading apparatus 600 according to a fourth exemplary embodiment of the present invention. FIG. 9A illustrates an optical path of the projection light rays for projecting an image, and FIG. 9B illustrates an optical path of the reading light rays for capturing an image. Unlike the first exemplary embodiment, in the image reading apparatus 600, a projection optical system 601 and an image pickup optical system 602 has an entirely identical configuration (the entire configuration is shared by the projection optical system 601 and the image pickup optical system 602). In other words, the image reading apparatus 600 includes only one image forming optical system (image forming unit) to be used for both projecting an image and capturing an image. This single image forming optical system includes a single variable aperture stop $A_M$ that is used for both projecting an image and capturing an image.

As illustrated in FIG. 9A, when projecting an image, the aperture diameter of the variable aperture stop $A_M$ is set to a first aperture diameter, and thus the image forming optical system is made to function as the projection optical system 601. As illustrated in FIG. 9B, when forming an image, the aperture diameter of the variable aperture stop $A_M$ is changed to a second aperture diameter, which is smaller than the first aperture diameter, and thus the image forming optical system is made to function as the image pickup optical system 602. With this configuration, as compared to the first exemplary embodiment, the number of components constituting the image forming optical system can be reduced, and the numerical aperture for projecting an image and for capturing an image can be set appropriately with a simpler configuration.

It is to be noted that the variable aperture stop $A_M$ may be disposed in an optical path between the projection surface 2 and an optical element closest to the projection surface 2, in an optical path between the deflection unit 604 and an optical element closest to the deflection unit 604, or the like, as necessary. In addition, another optical element may be disposed in an optical path between the display surface 1 and the deflection unit 604, in an optical path between the deflection unit 604 and the imaging surface 3, or the like, as necessary.

Fifth Exemplary Embodiment

FIG. 10 is a schematic diagram of a primary portion of an image reading apparatus 700 according to a fifth exemplary embodiment of the present invention. The image reading apparatus 700 has a configuration similar to that of the image reading apparatus 500 according to the third exemplary embodiment except in that a projection optical system 701 forms an image of the display surface 1 twice.

The projection optical system 701 according to the present exemplary embodiment forms an intermediate image 705 of the display surface 1 with an optical element disposed closer to the projection surface 2 than a deflection unit 704 and re-forms an image of the intermediate image 705 onto the projection surface 2 with an optical element disposed even closer to the projection surface 2. With such a configuration, the diameter of each of the optical elements in the projection optical system 701 can be reduced as compared to the projection optical system 501 according to the third exemplary embodiment.

In the present exemplary embodiment as well, similarly to the third exemplary embodiment, the entire projection optical system 701 is used as an intermediate image forming unit 701a of an image pickup optical system 702. Thus, the image pickup optical system 702 according to the present exemplary embodiment forms the first intermediate image 705 of the projection surface 2 and a second intermediate image 703 via the deflection unit 704 with the intermediate image forming unit 701a, and then re-forms an image of the second intermediate image 703 onto the imaging surface 3 with an image re-forming unit 702a. In other words, the image pickup optical system 702 according to the present exemplary embodiment forms an image of the projection surface 2 three times.

It is to be noted that the position at which the first aperture stop $A_P$ according to the present exemplary embodiment is disposed is not limited to be in the optical path between the optical elements disposed between the intermediate image 705 and the projection surface 2. For example, the first aperture stop $A_P$ may be disposed in an optical path between the intermediate image forming unit 701a and the projection surface 2, in an optical path between the intermediate image forming unit 701a and the deflection unit 704, in an optical path between the intermediate image 705 and an optical element closest to the intermediate image 705, or the like.

Sixth Exemplary Embodiment

FIG. 11 is a schematic diagram of a primary portion of an image reading apparatus 800 according to a sixth exemplary embodiment of the present invention. The image reading apparatus 800 has a configuration similar to that of the image reading apparatus 500 according to the third exemplary embodiment except in that an image re-forming unit 802a forms an image of an intermediate image 803 twice.

A projection optical system 801 according to the present exemplary embodiment forms an image of the display surface 1 only once as in the third exemplary embodiment, and an image pickup optical system 802 forms an image of the projection surface 2 three times unlike the third exemplary embodiment. Specifically, the image re-forming unit 802a in the image pickup optical system 802 forms a second intermediate image 805 of the first intermediate image 803 of the projection surface 2 that has once been formed by an intermediate image forming unit 801a. Then, the image re-forming unit 802a re-forms an image of the second intermediate image 805 onto the imaging surface 3 with an optical element disposed closer to the imaging surface 3 than the second intermediate image 805. With such a configuration, the diameter of each of the optical elements in the image re-forming unit 802a can be reduced as compared to the image re-forming unit 502a according to the third exemplary embodiment.

It is to be noted that the position at which the second aperture stop $A_C$, according to the present exemplary embodiment is disposed is not limited to be in the optical path between the optical elements disposed between the first intermediate image 803 and the second intermediate image 805. For example, the second aperture stop $A_C$ may be disposed in an optical path between the intermediate image 803 and the image re-forming unit 802a, in an optical path between the image re-forming unit 802a and the imaging surface 3, in an optical path between the second intermediate image 805 and an optical element closest to the second intermediate image 805, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-194482, filed Sep. 30, 2015, and Japanese Patent Application No. 2015-194483, filed Sep. 30, 2015 which are hereby incorporated by reference herein in their entirety.

The invention claimed is:

1. An image forming optical system, comprising:
a first image forming unit configured to form an enlarged image of a first surface onto a second surface;
a second image forming unit including at least a portion of the first image forming unit and configured to form an image of the second surface onto a third surface; and
a deflection unit disposed in an optical path between the second surface and the third surface and configured to deflect light,
wherein a numerical aperture of the first image forming unit on a side toward the second surface is larger than a numerical aperture of the second image forming unit on a side toward the second surface.

2. The image forming optical system according to claim 1, wherein the number of times the first image forming unit forms an image is smaller than the number of times the second image forming unit forms an image.

3. The image forming optical system according to claim 1, wherein the second image forming unit forms a reduced image of the second surface onto the third surface.

4. The image forming optical system according claim 1, wherein the second image forming unit includes an intermediate image forming unit constituted by at least a portion of the first image forming unit and configured to form an intermediate image of the second surface and an image re-forming unit configured to re-form and image of the intermediate image onto the third surface.

5. The image forming optical system according to claim 4, wherein the deflection unit is disposed in an optical path between the intermediate image forming unit and the intermediate image.

6. The image forming optical system according to claim 4, wherein the number of times the first image forming unit forms an image is equal to the number of times the intermediate image forming unit forms an image.

7. The image forming optical system according to claim 4, wherein the image re-forming unit forms an enlarged image of the intermediate image onto the third surface.

8. The image forming optical system according to claim 4, wherein the first image forming unit includes a first aperture stop disposed in an optical path between the deflection unit and the second surface.

9. The image forming optical system according to claim 4, wherein the second image forming unit includes a second aperture stop disposed in an optical path between the intermediate image and the third surface.

10. The image forming optical system according to claim 1, wherein the first image forming unit and the second image forming unit are constituted by a single common image forming unit, and the common image forming unit includes a variable aperture stop whose aperture diameter is variable.

11. An image reading apparatus, comprising:
a first image forming unit configured to form an enlarged image of a first surface onto a second surface;
a second image forming unit including at least a portion of the first image forming unit and configured to form an image of the second surface onto a third surface;
a deflection unit disposed in an optical path between the second surface and the third surface and configured to deflect light;
a display element configured to display an image on the first surface; and
an image pickup element disposed on the third surface,
wherein a numerical aperture of the first image forming unit on a side toward the second surface is larger than a numerical aperture of the second image forming unit on a side toward the second surface.

12. The image reading apparatus according to claim 11, wherein the following condition is satisfied:

$$NA_{C1} \leq NA_{P2} < NA_{P1}$$

wherein $NA_{P1}$ represents a numerical aperture of the first image forming unit on a side toward the second surface on an optical axis, $NA_{P2}$ represents a numerical aperture of the first image forming unit in a meridional direction at a maximum half angle of view of the second image forming unit, and $NA_{C1}$ represents a numerical aperture of the second image forming unit on a side toward the second surface on the optical axis.

13. The image reading apparatus according to claim 11, wherein the following condition is satisfied:

$$0.7 \leq \frac{NA_{C2}}{NA_{C1}} \leq 1$$

wherein $NA_{C1}$ represents a numerical aperture of the second image forming unit on a side toward the second surface on an optical axis, and $NA_{C2}$ represents a numerical aperture of the second image forming unit in a meridional direction at a maximum half angle of view of the second image forming unit.

14. The image reading apparatus according to claim 11, wherein the following condition is satisfied:

$$1.2 \leq \frac{VIG_C}{VIG_P}$$

wherein $VIG_P$ represents a relative illumination of the first image forming unit at a maximum half angle of view of the second image forming unit, and $VIG_C$ represents a relative illumination of the second image forming unit at the maximum half angle of view.

15. The image reading apparatus according to claim 11, wherein the image pickup element captures an image of the image projected on the second surface by the first image forming unit.

16. The image reading apparatus according to claim 11, wherein the image pickup element captures an image of an object placed on the second surface.

17. The image reading apparatus according to claim 11, wherein the image pickup element captures an image of an object placed on the second surface and an image of the image projected on the object by the first image forming unit.

18. The image reading apparatus according to claim 11, wherein the second image forming unit forms a reduced image of the second surface onto the third surface.

19. An image forming optical system, comprising:
a first image forming unit configured to form an image of a first surface onto a second surface;
a second image forming unit including at least a portion of the first image forming unit and configured to form an image of the second surface onto a third surface; and
a deflection unit disposed in an optical path between the second surface and the third surface and configured to deflect light,
wherein a numerical aperture of the first image forming unit on a side toward the second surface is larger than a numerical aperture of the second image forming unit on a side toward the second surface, and
wherein the second image forming unit includes an intermediate image forming unit constituted by at least a portion of the first image forming unit and configured to form an intermediate image of the second surface and an image re-forming unit configured to re-form an image of the intermediate image onto the third surface.

* * * * *